No. 790,573. Patented May 23, 1905.

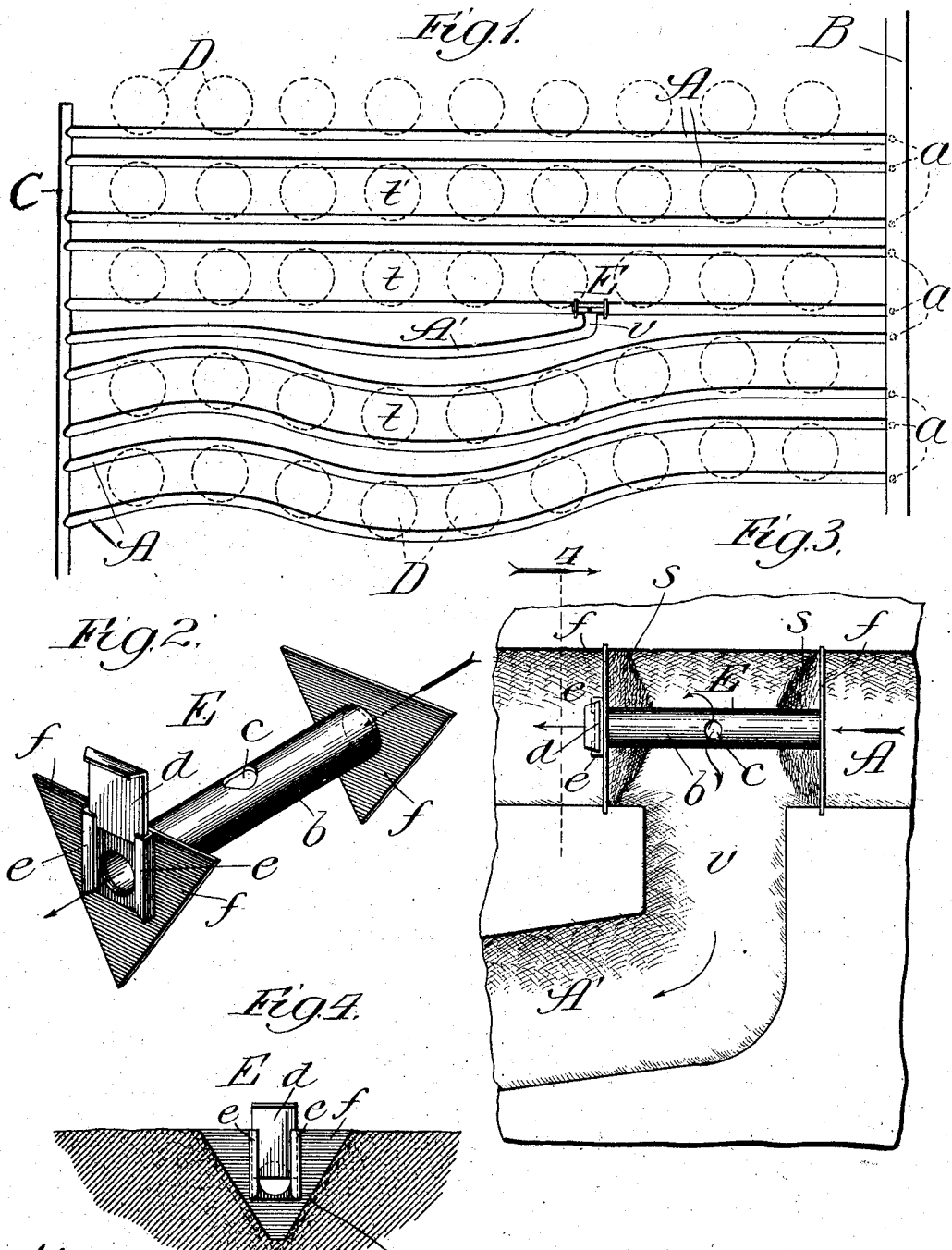

UNITED STATES PATENT OFFICE.

OLIVER H. HICKS, OF RIVERSIDE, CALIFORNIA.

WATER-DIVIDING FURROW-JOINT.

SPECIFICATION forming part of Letters Patent No. 790,573, dated May 23, 1905.

Application filed October 1, 1904. Serial No. 226,827.

*To all whom it may concern:*

Be it known that I, OLIVER H. HICKS, a citizen of the United States, residing at Riverside, in the county of Riverside and State of California, have invented a new and useful Improvement in Water-Dividing Furrow-Joints, of which the following is a specification.

The object of my invention is to provide improved means for dividing into two streams the water-supply to one irrigating or other furrow, thereby to direct a sufficient supply from that furrow to a supplemental furrow connected with it and to enable the proportion of water flowing to each said furrow or furrow-section to be readily and reliably controlled.

In the accompanying drawings, Figure 1 is a diagrammatic plan view of a system of irrigating-furrows as commonly employed in fruit-orchards with my improvement operatively applied therein; Fig. 2, an enlarged perspective view of my improved dividing device or joint; Fig. 3, a broken plan view showing on an enlarged scale over that presented in Fig. 1 the dividing-joint device in operative position, and Fig. 4 a section taken at the line 4 on Fig. 3 and viewed in the direction of the arrow.

The method now more commonly practiced of directing from the complement of water flowing into a furrow from a supply-flume from which the series of furrows proceed, a portion thereof into a supplemental furrow adjacent thereto, is to form a duct connection at a desired point between the ends of the main furrow and the supplemental furrow through which to direct part of the flow from the former into the latter. It is practically impossible, however, so to make this connection that a predetermined proportion of the water-supply to the main furrow shall continuously flow down through it and its branch, since the soil in which the duct is formed is unstable when wet, and soon after the divided flow is started through it its condition changes, and much attention and labor are required to obtain in that way even passably satisfactory results. It has been attempted to improve the working of the duct connection so provided by laying porous bagging in the duct between the main and branch furrows and holding it down with stones and soil, with the effect of lessening the tendency of the flow to wash away the soil in which the duct connection is made; but this is primitive and also unsatisfactory in result.

My improvement overcomes the difficulties referred to by interposing in the main furrow a substantial flow-regulating joint longitudinally, through which the water-supply to that furrow flows and from a branch outlet between the open ends of which a portion of the supply is directed to the branch or supplemental furrow.

Referring to the drawings, A A represent furrows formed in the soil of a fruit-orchard to extend between a supply-flume B at right angles to the series of furrows and a water-ditch C parallel with the flume. The water flows into the furrows from the flume through openings in the latter (indicated at $a$) and commonly provided with gates (not shown) for regulating the flow. The dotted circles D in Fig. 1 represent trees, between rows of which the furrows lie, the trees being usually set about twenty feet apart from row to row and from tree to tree in each row. At the furrow A in Fig. 1, shown to be provided with a branch A', the distance between trees $t\ t$ is greater than that between trees at $t\ t'$, by reason of the trees being set on a hillside and on the contour thereof to cause the fall from tree to tree to be uniform—say two inches to twenty feet. To insure proper soaking of all the soil in which the roots of the trees grow, it is desirable to provide the supplemental furrow A' for more extensive distribution of the irrigating-water which flows in an adjacent furrow A by connecting it with the latter, and this my improved device enables to be done readily, with the result of producing a reliably uniform and continuous division of the water flowing in the main furrow.

My improved joint E comprises a tube $b$, the diameter of which should afford to it a capacity adapting it to carry all the water that may be turned into a furrow A, the tube being open at its ends and provided between them with an outlet c, and at the distal end of the tube it is provided with a gate-valve d, confined to be raised and lowered between guides e e. On each end of the tube are shown V-shaped sharp-edged heads f f or shields for penetrating the soil to anchor the joint in place.

To apply my improvement, the device E is pressed with its valve d open into the respective furrow A to cause the tube b to extend lengthwise thereof and with the valve end toward the waste-ditch C, thus to enable the water flowing through the furrow to flow freely through the tube. The device is secured in its position by packing soil against the inner faces of the heads f, as represented at s in Fig. 3, and then the connection v is made at the discharge-opening c from the main furrow to the end, as shown, or other point in the supplemental furrow, when the gate d is closed to the required extent to divide the flow through the tube b into the desired proportions for passing lengthwise through it and through the discharge-opening c for supplying the branch furrow.

The device E, as shown and described, presents the best construction thereof now known to me for its purpose; but I realize that it may be variously modified in matters of detail, so that I do not intend to be understood as limiting my invention to the particular form of its embodiment herein set forth.

What I claim as new, and desire to secure by Letters Patent, is—

1. A water-dividing furrow-joint comprising a tube open at its ends, adapted to be laid in a furrow to extend lengthwise therein and provided at its discharge end with a valve and between its ends with an outlet for directing a portion of the water-flow through it into a supplemental furrow, and means for anchoring the tube in place, substantially as described.

2. A water-dividing furrow-joint comprising a tube open at its ends, adapted to be laid in a furrow to extend lengthwise therein and provided at its discharge end with a valve and between its ends with an outlet for directing a portion of the water-flow through it into a supplemental furrow, and heads on the ends of the tube, substantially as described.

3. A water-dividing furrow-joint comprising a tube open at its ends, adapted to be laid in a furrow to extend lengthwise therein and provided between its ends with an outlet for directing a portion of the water-flow through it into a supplemental furrow, V-shaped heads on the ends of the tube, and a gate-valve on the head at the discharge end, substantially as described.

OLIVER H. HICKS.

In presence of—
A. V. GEAR,
J. ARTHUR LAING.